United States Patent
Tak

(10) Patent No.: US 7,885,694 B2
(45) Date of Patent: Feb. 8, 2011

(54) MOBILE COMMUNICATION TERMINAL WITH DATA SCROLLING FEATURE

(75) Inventor: Yong Sang Tak, Seoul (KR)

(73) Assignee: LG Electronics Inc., Seoul (KR)

( * ) Notice: Subject to any disclaimer, the term of this patent is extended or adjusted under 35 U.S.C. 154(b) by 451 days.

(21) Appl. No.: 11/518,991

(22) Filed: Sep. 12, 2006

(65) Prior Publication Data

US 2007/0060218 A1    Mar. 15, 2007

(30) Foreign Application Priority Data

Sep. 12, 2005   (KR) ..................... 10-2005-0084825

(51) Int. Cl.
  *H04M 1/00*   (2006.01)
  *H03C 1/62*   (2006.01)
  *H04B 17/00*  (2006.01)
(52) U.S. Cl. ............. 455/575.4; 455/115.1; 455/115.2; 455/115.3; 455/115.4; 455/67.11; 455/67.14
(58) Field of Classification Search ............. 455/575.1, 455/575.3, 575.4, 556, 556.1, 550, 550.1, 455/566, 90, 95; 379/368, 433.06, 433.07; 715/830, 784, 829, 810; 345/156–172
See application file for complete search history.

(56) References Cited

U.S. PATENT DOCUMENTS

| 4,364,056 | A  | * | 12/1982 | Suzuki et al. | ................. | 346/29 |
| 2004/0067784 | A1 | * | 4/2004 | Kubo et al. | ............... | 455/575.4 |
| 2004/0077386 | A1 | * | 4/2004 | Nagasawa | ................ | 455/575.1 |
| 2004/0132499 | A1 | * | 7/2004 | Abe | ............ | 455/566 |
| 2004/0155869 | A1 | * | 8/2004 | Robinson et al. | ............. | 345/168 |
| 2004/0185920 | A1 | * | 9/2004 | Choi et al. | ............... | 455/575.1 |
| 2004/0198437 | A1 | * | 10/2004 | Yamamoto et al. | ........ | 455/556.1 |
| 2005/0052425 | A1 | * | 3/2005 | Zadesky et al. | ............. | 345/173 |
| 2006/0187089 | A1 | * | 8/2006 | Tolonen et al. | ................ | 341/22 |
| 2007/0061497 | A1 | * | 3/2007 | Takatsuka | ................... | 711/100 |

FOREIGN PATENT DOCUMENTS

| EP | 1 009 142 A2 | 6/2000 |
| EP | 1 408 673 A2 | 4/2004 |
| EP | 1 510 911 A2 | 3/2005 |
| GB | 2 355 144 A | 4/2001 |
| GB | 2 387 062 A | 10/2003 |
| JP | 11-194883 | 7/1999 |
| JP | 2001-136250 | 5/2001 |

(Continued)

OTHER PUBLICATIONS

XP002364006, Samsung Electronics: "GPRS Telephone SGH-D500", Nov. 2004.

(Continued)

*Primary Examiner*—Nick Corsaro
*Assistant Examiner*—Chuong A Ngo
(74) *Attorney, Agent, or Firm*—McKenna Long & Aldridge LLP

(57) ABSTRACT

A mobile communication terminal includes a folder unit or a slider, where an input unit is located on or included on a surface of the folder unit or slider, and the input unit includes at least one function key that generates a scroll signal that is used to scroll through the content data stored in a memory.

16 Claims, 6 Drawing Sheets

FOREIGN PATENT DOCUMENTS

| | | |
|---|---|---|
| JP | 2001-245351 | 9/2001 |
| JP | 2001-285427 | 10/2001 |
| JP | 2001-292213 | 10/2001 |
| JP | 2002-033809 | 1/2002 |
| JP | 2003-298699 | 10/2003 |
| JP | 2003-303043 | 10/2003 |
| JP | 2003-319036 | 11/2003 |
| JP | 2004-135177 | 4/2004 |
| JP | 2004-222316 | 8/2004 |
| JP | 2005-006161 | 1/2005 |
| KR | 2005-50803 | 6/2005 |
| KR | 2005-68329 | 7/2005 |

OTHER PUBLICATIONS

Samsung Electronics SGH-D500 User's Guide GH68-06047A, Jul. 2005, Rev 1.2 (7 pages).

* cited by examiner

MOBILE COMMUNICATION TERMINAL WITH DATA SCROLLING FEATURE

This application claims the benefit of Korean Patent Application No. 10-2005-0084825, filed on Sep. 12, 2005, which is hereby incorporated by reference as if fully set forth herein.

BACKGROUND

1. Field of the Disclosure

The present disclosure relates to a mobile communication terminal, and more particularly to a mobile communication terminal capable of scrolling through stored content data.

2. Discussion of the Related Art

A conventional mobile communication terminal is now described in detail. The conventional mobile communication terminal includes a display, a keypad, a speaker, and a microphone. A user of the mobile communication terminal can search through a variety of content data stored in the mobile communication terminal using predetermined keys associated with the keypad. The display displays the content data as they are being scrolled. The stored content data may be menu data for controlling functions of the mobile communication terminal or a variety of files stored in the mobile communication terminal. The variety of files may include, but are not limited to, a message, an MP3 file and image data.

The user can search through a variety of content data stored in the mobile communication terminal using predetermined keys associated with the mobile communication terminal. For instance, the user can search using at least one of four arrow keys including a right arrow key, a left arrow key, an up arrow key and a down arrow key. If the user touches or presses one of the aforementioned arrow keys once, the mobile communication terminal scrolls through the stored content data by one shift. For example, if the user wants to perform two scrolling operations in a downward direction and three scrolling operations in a right direction, the user must touch or press the down arrow key twice, and then touch or press the right arrow key three times.

The display displays the content data being scrolled in response to a direction signal that is generated each time the user touches or presses one of the four arrow keys.

A disadvantage of the above-mentioned conventional mobile communication terminal is that the user must separately touch or press the arrow keys for each shift through the stored content data.

Another disadvantage is that time is unnecessarily wasted while the user repeatedly presses the aforementioned arrow keys in order to search for desired content data.

SUMMARY

Accordingly, a mobile communication terminal that substantially obviates one or more problems due to limitations and disadvantages of the conventional mobile communication terminal is desirable.

The present disclosure may disclose a mobile communication terminal that may recognize a user's touching or pressing action, which facilitates for the user to conveniently search for desired content data from among a plurality of stored content data.

The present disclosure may disclose a mobile communication terminal that may rapidly search for desired content data from among a plurality of stored content data.

Additional advantages, objects, and features of the disclosure will be set forth in part in the description, which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages in accordance with the purpose of the invention, whose embodiments are described herein, according to one embodiment of the present invention, a mobile communication terminal includes a folder unit; a main body; a hinge unit that allows the folder unit to be folded and un-folded from the main body; a memory that includes content data; and an input unit that is located on a surface of the folder unit, the input unit including at least one function key that generates a scroll signal that is used to scroll through the content data.

In another embodiment of the present invention, there is provided a mobile communication terminal including; a slider; a main body that is connected to a rear surface of the slider; a slide unit disposed between the slider and the main body, and allows the slider to slide to and from the main body; a memory that includes content data; and an input unit located on a surface of the slider, the input unit including at least one function key that generates a scroll signal that is used to scroll through content data.

It is to be understood that both the foregoing general description and the following detailed description are exemplary and explanatory and should not be construed as limiting the scope of the claims.

BRIEF DESCRIPTION OF THE DRAWINGS

The accompanying drawings, which are included to provide a further understanding of the disclosure and are incorporated in and constitute a part of this application, illustrate embodiment(s) of the invention and together with the description serve to explain the principles of the various embodiments of the invention. In the drawings.

DETAILED DESCRIPTION

Reference will now be made in detail to the various embodiments of the present invention, examples of which are illustrated in the accompanying drawings. Wherever possible, the same reference numbers will be used throughout the drawings to refer to the same or like parts.

Figure 1:
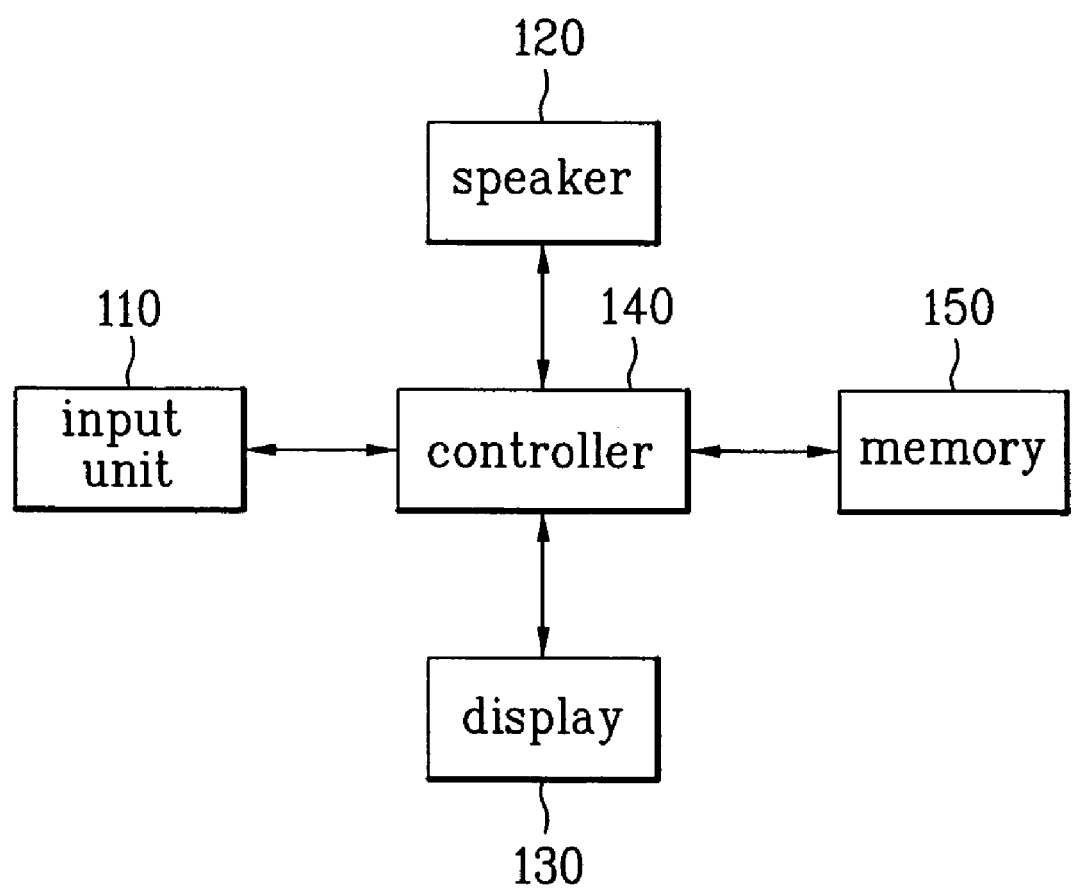
FIG. 1 is a block diagram illustrating an exemplary mobile communication terminal according to an embodiment of the present invention.
Figure 2:
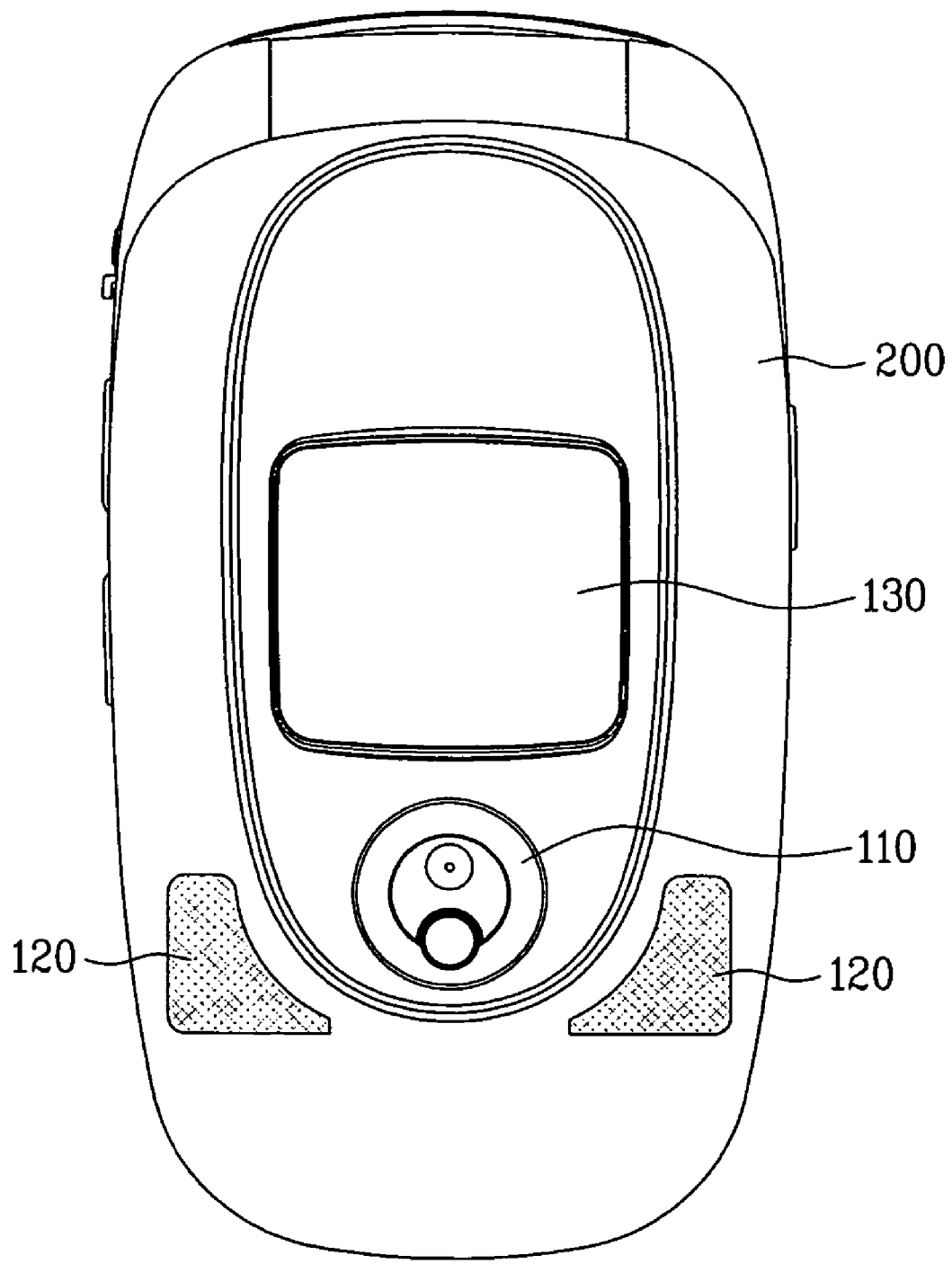
FIG. 2 is a front view of an exemplary mobile communication terminal according to an embodiment the present invention.

FIG. 1 is a block diagram illustrating an exemplary mobile communication terminal according to an embodiment of the present invention. FIG. 2 is a front view of an exemplary mobile communication terminal according to an embodiment of the present invention.

Referring to FIGS. 1 and 2, the mobile communication terminal may include an input unit 110, a speaker 120, a display 130, a controller 140, and a memory or storage unit 150.

The input unit 110 may be located on a front surface 200 of an upper portion of the mobile communication terminal. At this location, the user of the mobile communication terminal may access the input unit 110 even though the upper portion is closed on the mobile communication terminal. The input unit 110 may include a function key that is capable of generating a scroll signal if a user touches or presses the input unit 110.

The function key may include a search key and an acceleration key. The search key may generate a scroll signal that is used to navigate to a desired content data by scrolling through a variety of content data stored in the memory 150.

The acceleration key may generate an acceleration signal that may be used to search for desired content data by scrolling through a variety of content data stored in the memory 150 at a higher speed than a normal speed predefined in the mobile communication terminal. The normal scroll speed typically occurs when the search key is used.

The input unit 110 may include a sensing unit that may detect the user's touching or pressing action. For example, the sensing unit may be a touch-pad that generates a specific signal when the user's touching or pressing action is sensed. The input unit 110 may sense pressure or temperature from either a user's finger or object that comes in contact with the touch-pad. If the sensed pressure or temperature is equal to or higher than a reference pressure or temperature, the input unit 110 may generate a scroll signal. The input unit 110 may include a sensor that senses a user's touching or pressing action. The sensor may be a pressure sensor that senses pressure of the user's finger or object, or a temperature sensor that senses temperature of the user's finger or object. The input unit 110 senses the user's touching or pressing action by using the pressure or temperature sensor, and generates the scroll signal based on the sensed pressure or temperature.

In an alternative embodiment, the input unit 110 may sense a variation in current, resistance, or capacitance caused by the user's finger or object that comes in contact with the touch-pad. The input unit 110 may generate the scroll signal when the variation in current, resistance, or capacitance is equal to or higher than a reference value.

The sensing unit may be located at the bottom of the function key. The sensing unit may cover all or portions of the bottom of the function key. If the user touches or presses the function key, the sensing unit may sense the user's touching or pressing action by sensing the pressure or temperature of the user's finger and may generate the scroll signal.

The speaker 120 may convert audio data in the searched content data into sound.

The speaker 120 may be located at the front surface 200 of the upper part of the mobile communication terminal, or may be located at or included on a lateral surface of the upper part of the mobile communication terminal. The speaker 120 may also be located or included at a front surface or a lateral surface of a lower part of the mobile communication terminal. Usually, at least one speaker 120 may be present in the mobile communication terminal.

The memory 150 may store a variety of content data. The controller 140 may classify the plurality of content data stored in the memory 150 according to predetermined categories and subcategories. For example, the controller 140 may organize the content data into a hierarchy that includes categories and subcategories of the categories.

A display 130 displays the content data that are being scrolled in order to search for specific content data from the memory 150 and the searched specific content data based on a scroll signal from the controller 140.

For example, the scroll signal may be a signal providing location information of specific content data, a signal providing a scroll direction to search for specific content data, or a signal enabled to execute a scroll to search for specific content data stored in the memory 150.

The display 130 may be located at or included on the front surface 200 of the upper part of the mobile communication terminal. The mobile communication terminal may include at least one display 130.

The display 130 may be a Liquid Crystal Display (LCD). The LCD may be one of a Super Twisted Nematic (STN) LCD or a Thin Film Transistor (TFT) LCD. Alternatively, the display 130 may be an Organic Electro-Luminescent (OEL) display.

The display 130 may sequentially display the variety of content data being scrolled based on the scroll signal. The display 130 may sequentially display the variety of content data being scrolled based on a scroll direction selected from among the four directions (i.e., right, left, upward, or downward direction).

The memory 150 may store individual content data corresponding to digital audio signals. For example, if a content data output via the speaker 120 is selected, the speaker 120 generates sounds from the audio signal data of the content data. If the content data is based on digital audio signals, the content data may be converted, as necessary, to analog audio signal data suitable for the speaker 120 to generate sounds.

For example, if the searched content data is a music file configured as an MP3 file, the audio data stored in the music file may be converted into analog audio signals, which may be converted by the speaker 120 into sounds. If the searched content data is a moving image file, the audio data contained in the moving image file may be converted into analog audio signals, which may be converted by the speaker 120 into sounds. The display 130 may display the image data contained in the moving image file.

An amplifier may be associated with the speaker 120 to amplify the audio signals. The speaker 120 then generates sound based on the amplified audio signals.

Figure 3A:
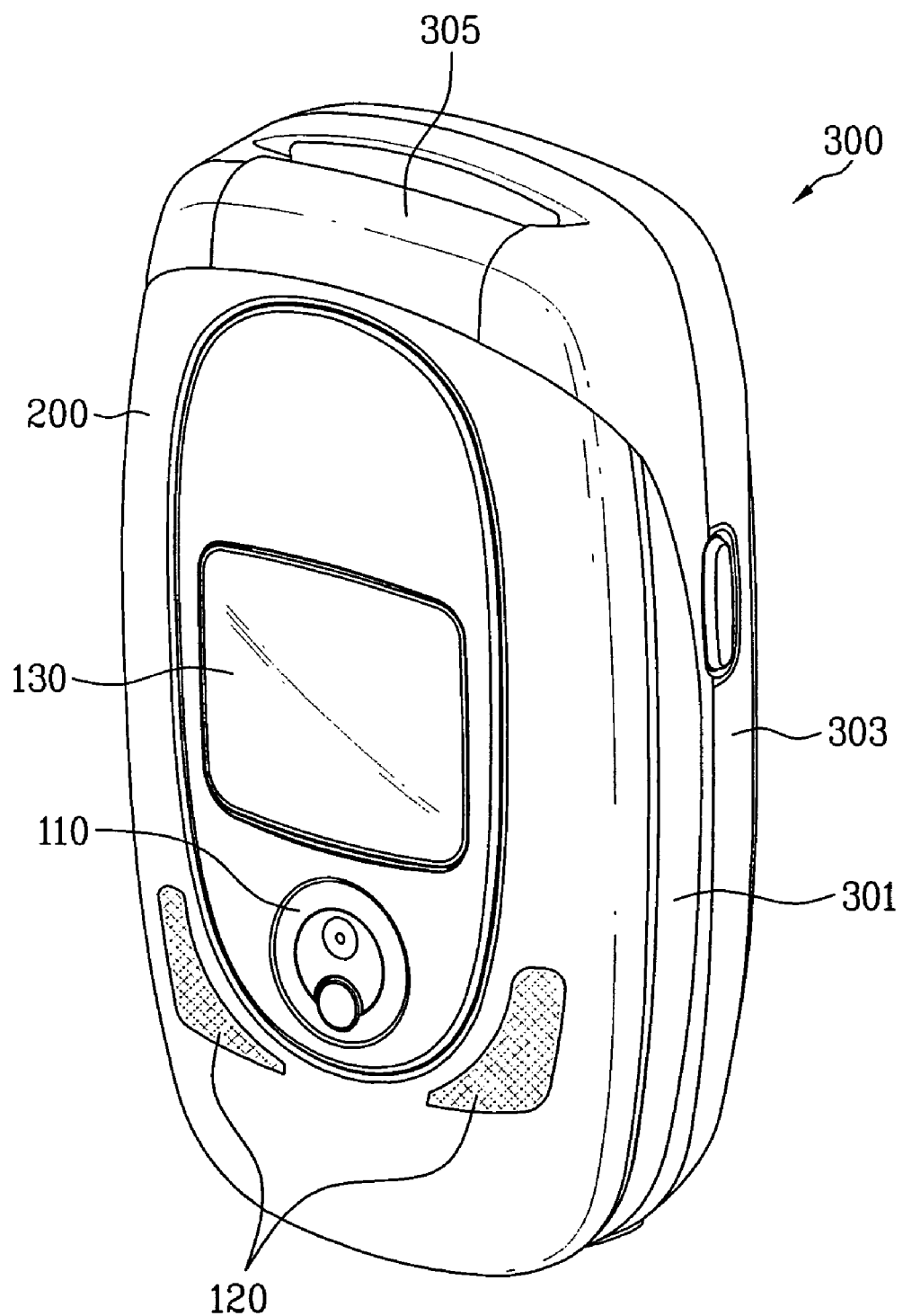
FIG. 3a is a perspective view of an exemplary folder-type mobile communication terminal according to an embodiment of the present invention.

FIG. 3a is a perspective view of an exemplary folder-type mobile communication terminal 300 according to an embodiment of the present invention. Referring to FIG. 3a, the folder-type mobile communication terminal 300 may include a folder unit 301, a main body 303, and a hinge unit 305 for pivotally connecting the folder unit 301 to the main body 303.

The front surface 200 of the folder unit 301 may include an input unit 110, a speaker 120, and a display 130. The input unit 110 may include a sensing unit that is capable of sensing a user's touching or pressing action, and generate a scroll signal. The display 130 may display the content data that are being scrolled and the searched specific content data. The speaker 120 may convert the audio signal, generated from the searched specific content data into sounds.

Although the folder unit 301 is folded on the folder-type mobile communication terminal 300, the searched specific content data may be displayed or may remain on the display 130 using the input unit 110, and audio data stored in the searched specific content data may still be generated into sound via the speaker 120.

For example, the speaker 120 may be located at or included on the front surface 200 or the lateral surface of the folder unit 301. The speaker 120 may also be located at the front surface or the lateral surface of the main body 303. Usually, at least one speaker 120 may be present in the mobile communication terminal 300.

One or more displays 130 may be present in the folder-type mobile communication terminal 300. The display 130 may be located or included on at least one of the front surface and the rear surface of the folder unit 301.

Figure 3B:
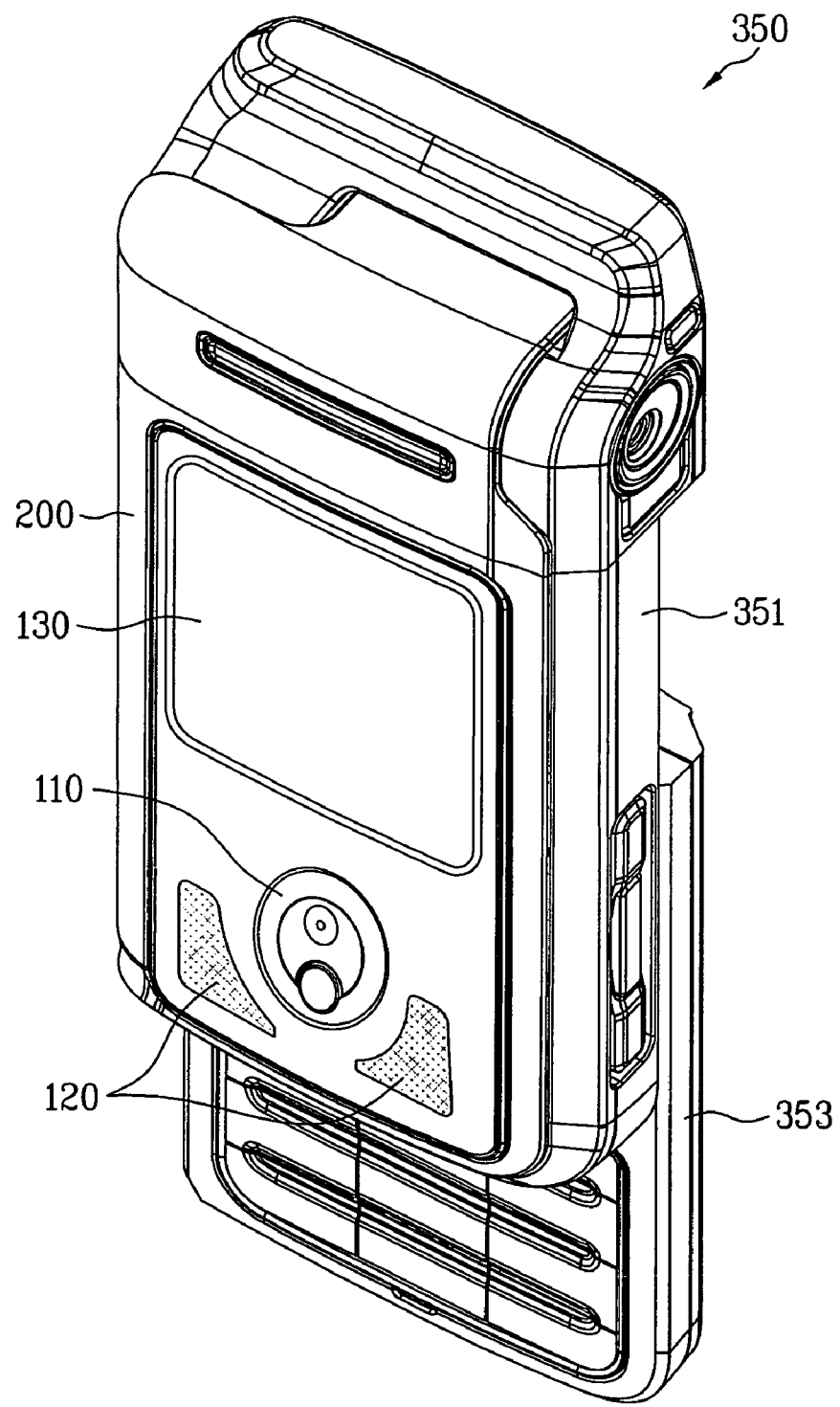
FIG. 3b is a perspective view of an exemplary slide-type mobile communication terminal according to another embodiment of the present invention.

FIG. 3b is a perspective view of an exemplary slide-type mobile communication terminal 350 according to another embodiment of the present invention. Referring to FIG. 3b, the slide-type mobile communication terminal 350 may include a slider 351, a main body 353, and a slide unit. The slide unit may be formed between the slider 351 and the main body 353, and may allow the slider 351 to slide to and from the main body 353.

Although the slide unit is not shown in FIG. 3b, the slide unit may be formed between a rear side of the slider 351 and a front side of the main body 353.

The front surface 200 of the slider 351 may include an input unit 110, a speaker 120, and a display 130. The input unit 110 may include a sensing unit that is capable of sensing a user's touching or pressing action, and generating a scroll signal. Also, the input unit 110 may be located at the lateral surface of the slider 351. The display 130 may display the content data that are being scrolled and the searched specific content data. The speaker 120 may convert the audio signal contained in the searched specific content data into sounds.

Although the slider 351 is in a closed position with respect to the main body 353 of the slide-type mobile communication terminal 350, the searched specific content data may still be displayed on the display 130 using the input unit 110, and audio data stored in the searched specific content data may still be generated into sound via the speaker 120.

For example, the speaker 120 may be located at or included on the front surface 200 or the lateral surface of the slider 351. The speaker 120 may also be located at or included on the front surface or the lateral surface of the main body 353. Usually, at least one speaker 120 may be present in the mobile communication terminal 350.

One or more displays 130 may be present in the slide-type mobile communication terminal 350.

A variety of embodiments of the input unit 110 of the mobile communication terminal according to the present invention will hereinafter be described with reference to FIGS. 4a, 4b, 4c, and 4d.

Referring to FIGS. 4a-4d, the input unit 110 may include search keys 410 and 430, and acceleration keys 420. The acceleration keys 420 may be included as a part of the search key 410. Also, the acceleration keys 420 may be connected to or attached to the search key 410.

The search key 410 may be configured to be circular and have two ends, and each acceleration key 420 may be located at one end of the circular search key 410.

The search keys 410 and 430 may include a touch-pad or a sensor to generate a scroll signal that may be used to search for desired content data when the user's touching or pressing action is sensed. According to one embodiment, if the user does not take his or her finger off one of the search keys 410 and 430, by continuous contact, the user may continuously scroll through the content data.

The acceleration keys 420 may generate an acceleration signal that may be used to scroll through content data at a higher speed than a normal speed predefined in the mobile communication terminal. The acceleration keys 420 may also be configured in the form of a protruded or recessed member to provide acceleration keys 420 with increased or enhanced tactile feeling to the user. Further details of the search keys 410 and 430, and the acceleration keys 420 will be described below.

Figure 4A:
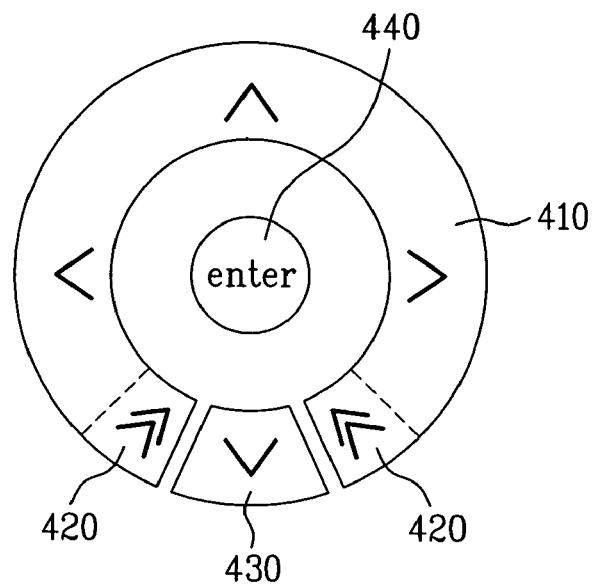
FIG. 4a is a front view of an exemplary input unit of a mobile communication terminal according to a first embodiment of the present invention.

FIG. 4a illustrates a front view of an input unit according to a first embodiment of the present invention. The input unit 110 may include search keys 410 and 430, acceleration keys 420, and an enter key 440.

The search key 410 may include an upper arrow key (^), a left arrow key (<), and a right arrow key (>). The search key 430 may include a lower arrow key (V). The search keys 410 and 430 may be used to select scroll direction and scroll in the scroll direction to search for the desired content data, and a controller 140 may scroll through content data stored in memory 150 according to the scroll direction. This scroll direction may be selected from at least one of four directions: a right direction; a left direction; an upward direction; and a downward direction.

For example, the downward direction is usually the default scroll direction. If the left arrow key (<) or the right arrow key (>) is touched or pressed by the user, the scroll direction may be set to the left or right direction, respectively. After the left arrow key (<) or the right arrow key (>) is selected, if the user wants to search for the desired content data in an upward or downward direction, the user may touch or press the upper arrow key (^) or the lower arrow key (V) and the scroll direction will be set to the upward direction or the downward direction, respectively.

For example, while using the search keys 410 and 430, if the user's finger remains in continuous contact with the search key 410 while simultaneously moving his or her finger in the right direction from one part to another part of the search key 410, the content data may be scrolled in the established scroll direction. In the meantime, if the user continuously remains in contact with the search key 410 while simultaneously moving his or her finger in the left direction from one part to the another part of the search key 410, the content data may be scrolled in the opposite direction of the established scroll direction.

The acceleration keys 420 are represented by the keys (<< and >>) on either end of the search key 410. If the user desires to search for specific content data using the acceleration keys 420, the user may press or touch one of the acceleration keys 420. Then, the controller 140 may scroll through the stored content data at a higher speed than a predetermined normal speed for a predetermined period of time. If the user does not take his or her finger off and continuously remains in contact with the acceleration key 420, the accelerated scroll operation may be continuously performed. However, if the user takes his or her finger off the acceleration key 420 or touches a specific key, the accelerated scroll operation may be terminated.

According to one embodiment, if the acceleration key 420 is pressed or touched, the content data scroll operation may be performed in pages. Also, the controller 140 may scroll through the stored content data on a page by page basis. For example, if the acceleration key 420 is touched once, the controller 140 scrolls from the current page to the next page in the established scroll direction.

The enter key 440, when touched or pressed by the user, may generate a signal capable of executing the searched specific content data. However, the enter key 440 may not be the only key that may cause a content data to be executed. For example, if the search key 410 and 430 is pressed or touched for a predetermined period of time at a searched content data, such action may generate a signal that causes the searched content data to be executed. In another example, if the user breaks contact with the search key 410 and 430 at the desired content data, such action may generate a signal that causes the searched content data to be executed.

Figure 4B:
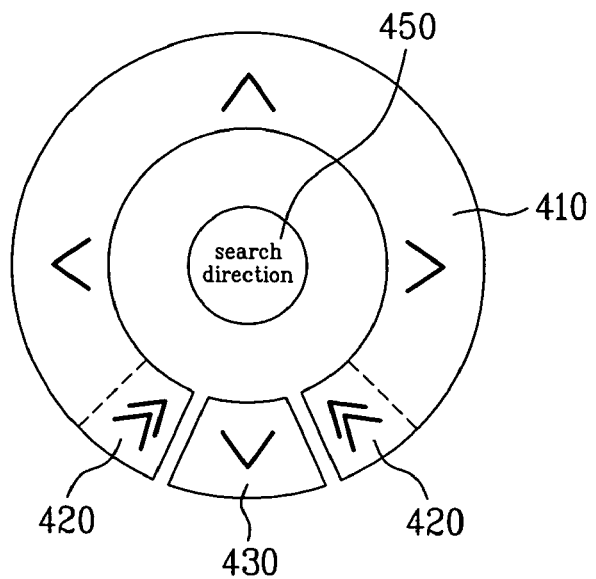
FIG. 4b is a front view of an exemplary input unit of a mobile communication terminal according to a second embodiment of the present invention.

FIG. 4b is a front view illustrating an exemplary input unit according to a second embodiment of the present invention. The input unit 110 may include search keys 410 and 430, acceleration keys 420, and a search direction key 450.

The operations and functions of the search keys 410 and 430, and the acceleration keys 420 in FIG. 4b may be similar to those of FIG. 4a, and are not further described.

For example, when determining the content scroll direction, the search direction key 450 may generate a scroll direction signal for determining one of four directions (i.e., right direction, left direction, upward direction and downward direction), and can determine the content scroll direction according to the generated scroll direction signal.

Figure 4C:
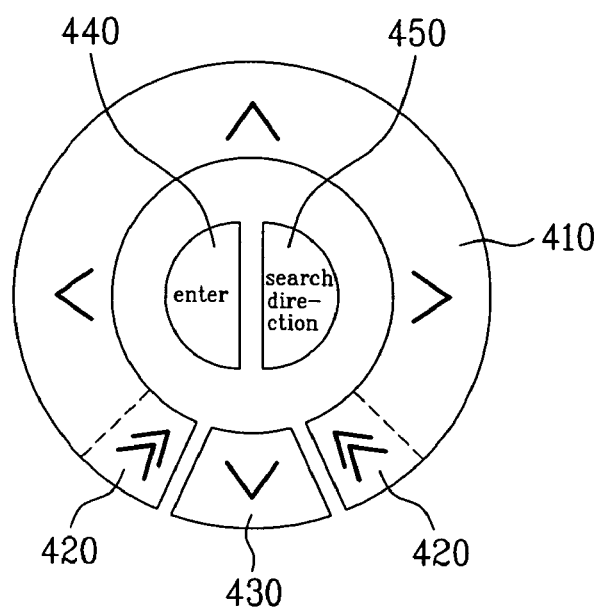
FIG. 4c is a front view of an exemplary input unit of a mobile communication terminal according to a third embodiment of the present invention.

FIG. 4c is a front view illustrating an exemplary input unit according to a third embodiment of the present invention. The input unit 110 may include search keys 410 and 430, acceleration keys 420, an enter key 440, and a search direction key 450.

The operations and functions of the enter key 440 and the search keys 410 and 430 may be similar to the enter key 440 and the search keys 410 and 430 described with respect to FIG. 4a. Therefore, their detailed description will be omitted here. The operations and functions of the search direction key 450 and the search keys 410 and 430 may be similar to the search direction keys 450 and the search keys 410 and 430 described with respect to FIG. 4b. Therefore, their detailed description will be omitted here. The operations and functions of the acceleration keys 420 may be similar to the accelerated keys 420 described with respect to FIG. 4a. Therefore, their detailed description will be omitted here.

Figure 4D:
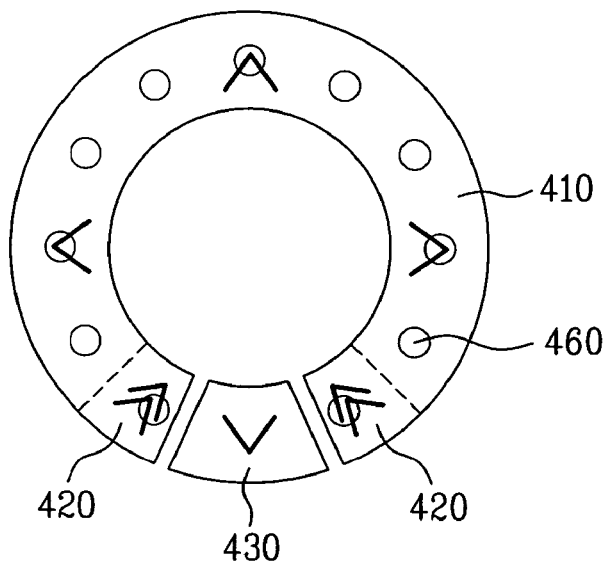
FIG. 4d is a front view of an exemplary input unit of a mobile communication terminal according to a fourth embodiment of the present invention.

FIG. 4d is a front view illustrating an exemplary input unit according to a fourth embodiment of the present invention. The input unit 110 may include a search key 410 that includes at least two or more sensors 460. When two or more sensors are touched or pressed, the action may generate a signal that may be used to scroll a number of content data in a predetermined direction. Also, a controller 140 may scroll through a number of content data stored in memory 150 in a direction based on the number or sequence of sensors activated, or scroll through the content data at a higher speed than a predefined speed based on the number or sequence of sensors activated. For example, the sensors 460 may be positioned at specific locations at the search key 410, or may be uniformly positioned throughout the search key 410. Alternatively, the sensors 460 may be positioned at intervals of predetermined distance along the search key 410.

As an example, when the user touches or presses two sensors 460 successively, then one piece of content data may be scrolled in a predetermined direction, depending on which sensor was touched or pressed first and which sensor was touched or pressed next. If three sensors 460 are consecutively touched or pressed, then two pieces of content data may be scrolled in a predetermined or established direction.

Alternatively, the sensors 460 may be used to control the rate of scroll through the variety of content data. For example, if the user presses or touches one sensor 460, then the content data may be scrolled at a slow speed. If the user consecutively touches or presses two or more sensors 460, the content data may be scrolled at a higher speed. Thus, the scroll speed may be dependent on the number of sensors 460 touched or pressed.

The sensors 460 may be configured in a form of a protruded or recessed member to provide an increased or enhanced tactile feeling to the user.

As apparent from the above description, a mobile communication terminal may sense the user's touching or pressing action using a touch-pad or a sensor, such that it allows the user to conveniently search for desired content data.

The mobile communication terminal may quickly search or increase the searching speed for desired content data using the acceleration key contained in the input unit of the mobile communication terminal.

The mobile communication terminal may adjust a content search speed using the search key or the acceleration key contained in the input unit of the mobile communication terminal.

The mobile communication terminal may easily or readily establish a content search direction using the search direction key contained in the input of the mobile communication terminal.

The mobile communication terminal may convert the searched content data into an audio signal, which is then converted into sound using a speaker.

It will be appreciated that, in various of the above-disclosed and other features and functions, or alternatives thereof, may be implemented on a programmed microprocessor, a microcontroller, an integrated circuit element such as ASIC, PLD, PLA, FPGA, or PAL, or the like, a hardwired electronic or logic circuit, or a programmable logic device.

It will be appreciated that the described flow process can be implemented as a sequence of computerized steps that lead to a desired result. These steps can be defined by and/or included in one or more computer instructions stored in a computer-readable medium, which should be understood to encompass using a carrier wave, or the like to provide the software instructions to a processing device. These steps can be performed by a processor executing the instructions that define the steps. Further, the flow process can be performed by a processor executing one or more appropriate programs, by special purpose hardware designed to perform the method, or any combination of such hardware, firmware and software elements.

It will be appreciated that several of the above-disclosed and other features and functions, or alternatives thereof, may be desirably combined into many other different devices or applications. Also, various presently unforeseen or unanticipated alternatives, modifications, variations or improvements therein may be subsequently made by those skilled in the art, and are also intended to be encompassed by the following claims.

What is claimed is:

1. A mobile communication terminal comprising:
   a slider;
   a main body that is connected to a rear surface of the slider;
   a slider unit disposed between the slider and the main body, and allows the slider to
   slide to and from the main body;
   a memory that includes content data; and
   a single input unit located on a front surface of the slider, the single input unit comprising:
   an inner peripheral edge and an outer peripheral edge, a first discrete function key that generates a scroll signal for scrolling through content data stored in the memory at a first scroll rate and a second discrete function key that generates an acceleration signal for scrolling through content data stored in the memory at a second scroll rate, wherein the first and second discrete function keys are located at opposite ends of the single input unit and within an area defined by the inner and outer peripheral edges, and a sensing unit that detects a user's touching action, wherein the sensing unit includes at least two sensors, configured to generate a search direction signal based on the number or sequence of sensors activated.

2. The mobile communication terminal of claim 1, further comprising:

at least one speaker that converts an audio signal generated from a searched content data into sound.

3. The mobile communication terminal of claim 1, wherein the second function key protrudes or is recessed relative to the first function key.

4. The mobile communication terminal of claim 1, wherein the input unit further includes a search direction key configured to generate a scroll direction signal.

5. The mobile communication terminal of claim 4, further comprising a controller configured to scroll through the content data in a direction based on the scroll direction signal.

6. The mobile communication terminal of claim 1, wherein the input unit further includes an enter key, wherein the enter key generates a signal used to execute the searched content data.

7. The mobile communication terminal of claim 1, wherein the sensing unit includes a pressure sensor.

8. The mobile communication terminal of claim 1, wherein the sensing unit includes a temperature sensor.

9. The mobile communication terminal of claim 1, further comprising a controller in communication with the first function key and the second function key, the controller configured to scroll through the content data at the first scroll rate in response to the scroll signal, and at the second scroll rate in response to the acceleration signal.

10. The mobile communication terminal of claim 9, wherein the controller is configured to scroll through the content data on a page by page basis in response to the acceleration signal.

11. The mobile communication terminal of claim 1, further comprising a controller configured to scroll through content data in a direction based on the search direction signal.

12. The mobile communication terminal of claim 1, wherein the input unit further comprises a plurality of first function keys, wherein each of the plurality of first function keys is associated with a corresponding one of a plurality of scroll directions.

13. The mobile communication terminal of claim 1, wherein the first function key comprises a plurality of touch positions, wherein each of the plurality of touch positions is associated with a corresponding one of a plurality of scroll directions.

14. The mobile communication terminal of claim 1, wherein the first function key and the second function key are located at different positions on the same key.

15. The mobile communication terminal of claim 1, further comprising:

a controller configured to execute a function associated with searched content data when actuation of the first function key is released.

16. The mobile communication terminal of claim 1, further comprising:

a controller configured to execute a function associated with searched content data when the first function key is actuated for a predetermined period of time.

* * * * *